United States Patent [19]
Hebert

[11] Patent Number: 5,373,384
[45] Date of Patent: Dec. 13, 1994

[54] SEMICONDUCTOR LIGHT SOURCE WITH NON-LINEAR COMPENSATION MEANS WITHIN A PREDISTORTION CIRCUIT

[75] Inventor: Jean-Paul Hebert, Saint-Remy les Chevreuse, France

[73] Assignee: Alcatel Cit, Paris, France

[21] Appl. No.: 99,550

[22] Filed: Jul. 30, 1993

[30] Foreign Application Priority Data

Aug. 14, 1992 [FR] France ................. 92 10044

[51] Int. Cl.$^5$ ............................................ H04B 10/00
[52] U.S. Cl. ................................... 359/161; 359/180; 327/317; 327/514
[58] Field of Search ............... 359/161, 154, 173, 180, 359/187; 372/38; 328/162, 163; 307/311; 375/60; 330/149

[56] References Cited

U.S. PATENT DOCUMENTS

| | | | |
|---|---|---|---|
| 4,032,802 | 6/1977 | Pau et al. | 307/311 |
| 4,992,754 | 2/1991 | Blauvelt et al. | 328/163 |
| 5,068,863 | 11/1991 | Fulton | 372/38 |
| 5,119,392 | 6/1992 | Childs | 372/38 |
| 5,132,639 | 7/1992 | Blauvelt et al. | 328/163 |
| 5,252,930 | 10/1993 | Blauvelt | 328/163 |

OTHER PUBLICATIONS

Wu, Jingshown et al, "Linearization of Laser-Diode... Communication", *International Journal of Optoelectronics*, 1988, vol. 3, No. 6, pp. 523–533.
Japanese Patent Abstract 59-36446 dated Feb. 28, 1984.
Asatani, Koichi et al, "Linearization of LED Nonlineareity by Predistortions", *IEEE Journal of Solid-State Circuits,* vol. 13, No. 1, Feb. 1978, pp. 133–138.

*Primary Examiner*—Herbert Goldstein
*Assistant Examiner*—Kinfe-Michael Negash
*Attorney, Agent, or Firm*—Sughrue, Mion, Zinn, Macpeak & Seas

[57] ABSTRACT

An input signal provided by a generator is applied to a laser emitting diode via a predistortion circuit for improving the linearity of the response of the source. The predistortion circuit includes a linear pi attenuator member constituted by resistances and a non-linear compensating element constituted by a Schottky diode connected in parallel with said attenuator member. The invention is particularly applicable to making light transmitting cable heads for optical fiber telecommunications systems.

8 Claims, 1 Drawing Sheet

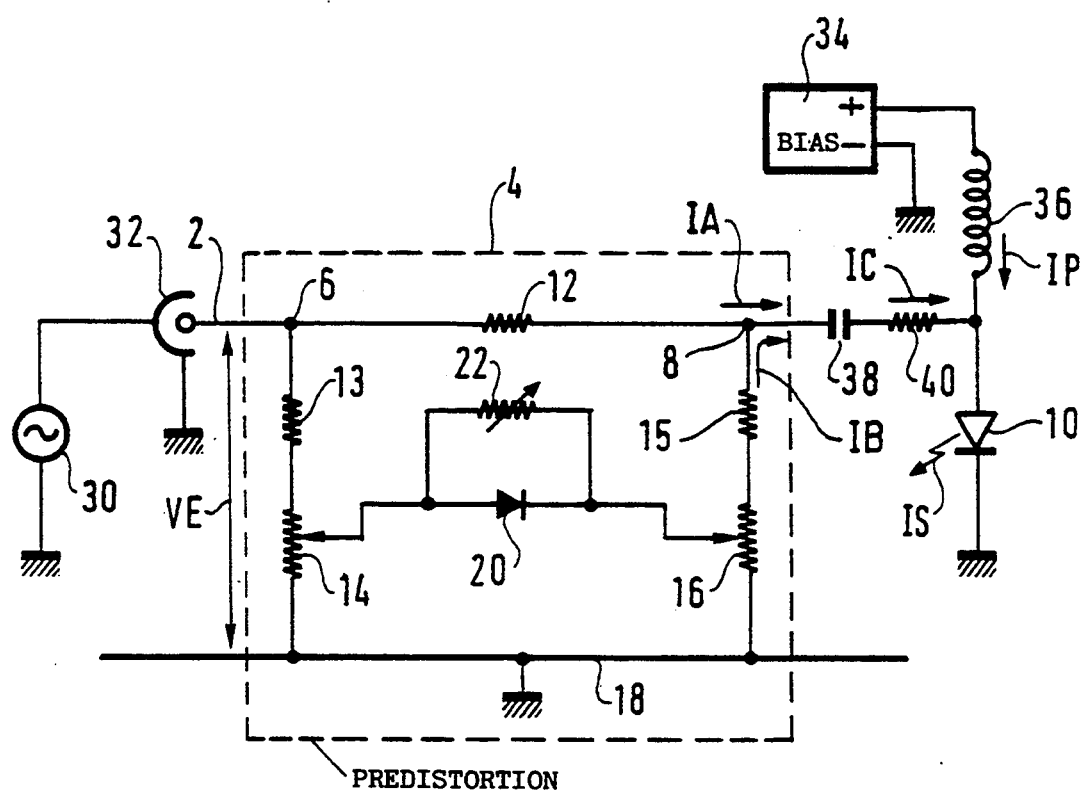

SEMICONDUCTOR LIGHT SOURCE WITH NON-LINEAR COMPENSATION MEANS WITHIN A PREDISTORTION CIRCUIT

FIELD OF THE INVENTION

Semiconductor light sources in which the light emitter is constituted by a laser diode are commonly employed for transmitting information by means of optical fibers. Such a light source then provides a lightwave which is modulated by information to be transmitted and as conveyed by an input signal delivered to the source. Typically, for this purpose, the laser diode receives an electrical power supply current constituted by a DC (or substantially unvarying) biased current superposed on an alternating control current of smaller magnitude.

Variations in the control current constitute a control signal representative of the input signal, with the meanings of these terms being specified by the following definitions that are adopted in the remainder of the present specification:

a "signal" is constituted by a succession in time of values, independently of the nature of the physical magnitude presenting said values;

two signals are "in linear correspondence" when one of them may be obtained from the other by combining two operations, one of the operations being multiplication by a constant coefficient, the other operation being addition or subtraction of a constant value, optionally together with an offset in time;

a second signal is "representative" of a first if the first signal can be reconstituted from the second signal by applying a predetermined correspondence relationship; and a second signal representative of a first signal presents "distortion" relative to said first signal insofar as it differs from a third signal in linear correspondence with said first signal. Such distortion can be defined by a distortion or a predistortion relationship which constitutes a transformation of values that, if applied to said third signal, would transform it into said second signal.

Referring now to the laser diodes that constitute the emitters of semiconductor light sources, the characteristic curve of such a diode shows how light intensity (i.e. the intensity of the lightwave delivered by the diode) varies as a function of its electrical power supply (i.e. its drive current). Starting from low drive valves, this characteristic begins with a linear portion that extends to a value marking a linearity limit which corresponds typically to an output light power of about 10 mW. Thereafter the characteristic has a curved portion in which a change in drive gives rise to a change in light intensity that is smaller than it would have been if the same change in drive had been applied in the linear region.

If the bias current is close to the linearity limit, and if the optical signal constituted by variations in light intensity is taken into consideration, then this lack of linearity in the characteristic curve causes the optical signal to be distorted relative to the control signal that gave rise to it.

Other phenomena can also distort the light signal relative to the control signal, e.g. the emitter may be frequency sensitive, i.e. the characteristic curve of the emitter may vary as a function of the frequency of components in the electrical power supply signal.

Such distortion can often become troublesome when the modulation applied by the source to the lightwave it delivers is amplitude modulation and when the control signal is constituted directly by the input signal. Under such circumstances, the desire to avoid such distortion can lead to bias current being limited, thereby presenting the drawback of limiting the intensity of the light provided by the source. It is also possible to include a predistortion circuit in the source, where the predistortion circuit receives the input signal and transforms it into a control signal such that the light signal finally obtained is in linear correspondence with the input signal.

BACKGROUND OF THE INVENTION

Circuits of that kind are known, in particular from the following documents: International Journal of Optoelectronics, Vol. 3, No. 6, 1988, pages 523–533; Jing-shown Wu et al., "Linearization of laser-diode non-linearity for broadband analog fiber-optic communication"; and IEEE Journal of Solid State Circuits, Vol. 13, No. 1, February 1978, New York, US, pages 133–138; and Asatani et al., "Linearization of LED non-linearity by predistortions". They suffer from the drawback of including active components that require a power supply circuit.

Another known predistortion circuit is described by the following document: Patent Abstracts of Japan, Vol. 8, No. 123 (E-249) (1560) 1984 and JP-A-59 36 446 (Matsushita). It suffers from a drawback of compensating the distortion of known types of laser diode in part, only.

OBJECTS AND SUMMARY OF THE INVENTION

A particular object of the present invention is to provide a semiconductor light source in simple manner that is capable of delivering high light intensity while giving rise to reduced distortion only. More generally, an object of the invention is to improve an optical fiber information transmission system.

To this end, the present invention provides a semiconductor light source including non-linear compensation means within a predistortion circuit for applying predistortion to an input signal constituted by an electrical voltage and carrying information to be transmitted, said predistortion transforming the input signal into a control signal, the control signal being applied to a semiconductor light emitter having a light-emitting junction that responds by providing an output light signal while conferring a non-linear characteristic curve to said emitter;

wherein between its terminals said predistortion circuit includes an attenuator member having a linear resistive response and also a compensating diode to provide said control signal in the form of variations in an electrical control current having an attenuated component that has passed through said attenuator member and in which a compensating component of the same sign has passed through said compensating diode in the forwards direction thereof, said light emitter being constituted by a diode having a forwards direction, and said control current passing through said diode in said forwards direction.

The compensating diode has a non-linear characteristic curve and it is selected to be capable of being matched by means of simple components having linear responses to the non-linear characteristic curve of the light emitter so that the light signal is substantially in linear correspondence with the input signal.

BRIEF DESCRIPTION OF THE DRAWING

An implementation of the present invention is described in greater detail below by way of non-limiting example and with reference to the sole diagrammatic figure of the accompanying drawings.

The FIGURE shows a light source in accordance with the invention.

MORE DETAILED DESCRIPTION

In general, the light source includes the following elements which are known as to their functions specified below:

a source input terminal 2 for receiving an input signal VE in electrical form, which signal includes one or more frequency channels for representing one or more individual signals to be transmitted in optical form. This signal is an alternating signal. It is delivered by members symbolized by a signal generator 30, and it is transmitted to the source by a coaxial line 32. Its frequencies may typically be as great as 800 MHz, and its amplitude may be 1 V;

a predistortion circuit 4 including a circuit input terminal 6 fed from said source input terminal and responding to said input signal VE by delivering on a circuit output terminal 8 a control signal IC that is electrical. Compared with the input signal, the control signal has distortion that is defined by a predistortion relationship; and finally a semiconductor light emitter 10 constituted by a monomode laser diode having a distributed grating.

The active portion of the diode is a light-emitting junction formed between two semiconductive layers of opposite conductivity types on either side of an active strip constituting an optical waveguide.

The diode is biased to the vicinity of said linearity limit in its characteristic curve by a bias current IP delivered by a bias circuit 34 via a decoupling inductor 36. It receives the control signal via a decoupling capacitor 38 and a load resistor 40, such that the electrical power supply fed to said diode exceeds its linearity limit, at least temporarily. In response to this control signal, the diode emits a lightwave in which variations of intensity define an output light signal. Relative to the control signal, this output signal presents distortion which is defined by a distortion relationship.

The predistortion relationship mentioned above is selected to be the inverse of said distortion relationship so that the output signal is in substantially linear correspondence with said input signal.

Between its input terminal 6 and its output terminal 8, the predistortion circuit 4 comprises a linear attenuator member 12, 13, 14, 15, and 16 suitable for applying an attenuation factor to the input signal independently of the magnitude of said signal, and having a value of 6 dB to 7 dB, for example. The predistortion circuit also includes a compensating diode whose electrical resistance decreases with increasing electrical current passing through it.

The attenuator member is preferably a pi attenuator circuit, as shown. It comprises:

a series resistor 12 connected between the input and output terminals 6 and 9 of the circuit;

a parallel input resistance 13, 14, connected between the input terminal 6 of the circuit and electrical ground 18 of the circuit; and a parallel output resistance 15, 16 connected between the output terminal 8 of the circuit and said electrical ground.

By way of example, the compensating diode may be a Schottky diode. Like the light-emitting diode 10, it is connected so that the compensating component of the control current passes through it in its forward direction. It is connected to the input and output terminals 6 and 8 of the circuit in particular via a serial input adjustment resistance 14 and a serial output adjustment resistance 16, which resistances constitute portions of the parallel input and output resistances of the attenuator.

The compensating diode also includes a parallel adjustment resistance 22 connected across its terminals.

To facilitate understanding, the attenuated and compensating components of the control current are represented in the figure by IA and IB respectively, it being understood that this representation does not correspond exactly to the real distribution of currents within the circuit shown, but that the real distribution is easily calculated exactly by the person skilled in the art.

By way of example, the resistances in the predistortion circuit 4 may be as follows:

resistance 12: 56 ohms;
resistance 13: 120 ohms;
resistance 14: 100 ohms;
resistance 15: 120 ohms;
resistance 16: 100 ohms; and
resistance 22: 470 ohms.

The present invention makes it possible to obtain an improvement in linearity characterized by a reduction of about 10 dB in the primary intermodulation components that appear when an input signal having a plurality of carrier frequencies is applied to a device having non-linear response, such components being known as composite second-order (CSO) components.

I claim:

1. A semiconductor light source comprising: a semiconductor light emitter having a light-emitting junction; non-linear compensation means within a predistortion circuit for applying predistortion to an input signal constituted by an electrical voltage and carrying information to be transmitted, said applied predistortion transforming the input signal into a control signal; and means for applying the control signal to said light-emitting junction that responds by providing an output light signal while conferring a non-linear characteristic curve to said light emitter;

wherein between terminals of said predistortion circuit there are coupled an attenuator member, having a linear resistive response, and also a compensating diode, to provide said control signal in the form of variations in an electrical control current having an attenuated component that has passed through said attenuator member and in which a compensating component of the same sign has passed through said compensating diode in the forward direction thereof, said light emitter being constituted by a light-emitting diode having a forward direction, and said control current passing through said light-emitting diode in said forward direction.

2. A source according to claim 1, further comprising a source input terminal for receiving said input signal;
said predistortion circuit, comprising:
- a circuit input terminal fed from said source input terminal;
- a circuit output terminal for delivering said control signal in response to said input signal, the control signal presenting distortion relative to said input signal, which distortion is defined by a predistortion relationship;
- said attenuator member being between said circuit input and output terminals; and
- said compensating diode being between said circuit input and output terminals, said light-emitting diode presenting electrical resistance that decreases with increasing current passing therethrough, said light source finally including said semiconductor light emitter that receives said control signal, the output light signal presenting distortion relative to said control signal, which distortion is defined by a distortion relationship, said predistortion relationship being the inverse of said distortion relationship such that said output signal is substantially in linear correspondence with said input signal.

3. A source according to claim 2, wherein said compensating diode is a Schottky diode.

4. A source according to claim 2, wherein attenuator member is a pi attenuator comprising:
- a series resistance connected between said circuit input and output terminals;
- an input parallel resistance connected between said circuit input terminal and electrical ground of said circuit; and
- an output parallel resistance connected between said circuit output terminal and said electrical ground.

5. A source according to claim 2, wherein said compensating diode is connected to said circuit input and output terminals via an input series adjustment resistance and an output series adjustment resistance, respectively.

6. A source according to claim 2, wherein said compensating diode is provided with a parallel adjustment resistance connected across its terminals.

7. The semiconductor light source according to claim 1, wherein said light emitter is a laser diode.

8. A predistortion circuit for a semiconductor light source including a semiconductor light emitter having a light-emitting junction, said predistortion circuit comprising: non-linear compensation means for applying predistortion to an input signal constituted by an electrical voltage information to be transmitted, said applied predistortion transforming the input signal into a control signal and means for applying the control signal to said light-emitting junction that responds by providing an output light signal while conferring a non-linear characteristic curve to said light emitter;
- wherein between terminals of said predistortion circuit there are coupled an attenuator member, having a linear resistive response, and also a compensating diode, to provide said control signal in the form of variations in an electrical control current having an attenuated component that has passed through said attenuator member and in which a compensating component of the same sign has passed through said compensating diode in the forward direction thereof;
- said light emitter being constituted by a light-emitting diode having a forward direction and said control current passing through said light-emitting diode in said forward direction.

* * * * *